(12) United States Patent
Ding et al.

(10) Patent No.: US 11,138,266 B2
(45) Date of Patent: Oct. 5, 2021

(54) LEVERAGING QUERY EXECUTIONS TO IMPROVE INDEX RECOMMENDATIONS

(71) Applicant: Microsoft Technology Licensing, LLC, Redmond, WA (US)

(72) Inventors: Bailu Ding, Bellevue, WA (US); Sudipto Das, Redmond, WA (US); Surajit Chaudhuri, Redmond, WA (US); Vivek R Narasayya, Redmond, WA (US); Ryan Marcus, Redmond, WA (US); Lin Ma, Redmond, WA (US); Adith Swaminathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 16/282,116

(22) Filed: Feb. 21, 2019

(65) Prior Publication Data

US 2020/0272667 A1 Aug. 27, 2020

(51) Int. Cl.
*G06F 7/02* (2006.01)
*G06F 16/00* (2019.01)
*G06F 16/903* (2019.01)
*G06F 16/906* (2019.01)
(Continued)

(52) U.S. Cl.
CPC ...... *G06F 16/90335* (2019.01); *G06F 16/901* (2019.01); *G06F 16/906* (2019.01); *G06N 20/00* (2019.01)

(58) Field of Classification Search
CPC ............ G06F 16/90335; G06F 16/906; G06F 16/901; G06F 16/24542; G06F 16/2453; G06F 16/22; G06N 20/00
See application file for complete search history.

(56) References Cited

U.S. PATENT DOCUMENTS

| 6,266,658 | B1 | 7/2001 | Adya et al. |
| 7,747,606 | B2 | 6/2010 | Dageville et al. |
| 7,958,113 | B2 | 6/2011 | Fan et al. |

(Continued)

OTHER PUBLICATIONS

"Amazon Aurora Customer Testimonials", Retrieved from: https://aws.amazon.com/rds/aurora/customers/, Oct. 25, 2018, 32 Pages.

(Continued)

*Primary Examiner* — Bruce M Moser
(74) *Attorney, Agent, or Firm* — Schwegman Lundberg & Woessner, P.A.

(57) ABSTRACT

Systems and techniques for leveraging query executions to improve index recommendations are described herein. In an example, a machine learning model is adapted to receive a first query plan and a second query plan for performing a query with a database, where the first query plan is different from the second query plan. The machine learning model may be further adapted to determine execution cost efficiency between the first query plan and the second query plan. The machine learning model is trained using relative execution cost comparisons between a set of pairs of query plans for the database. The machine learning model is further adapted to output a ranking of the first query plan and second query plan, where the first query plan and second query plan are ranked based on execution cost efficiency.

20 Claims, 8 Drawing Sheets

(51) Int. Cl.
*G06F 16/901* (2019.01)
*G06N 20/00* (2019.01)

(56) References Cited

U.S. PATENT DOCUMENTS

| | | | |
|---|---|---|---|
| 9,727,604 B2* | 8/2017 | Jin | G06F 16/245 |
| 10,140,336 B1* | 11/2018 | Gu | G06F 16/24578 |
| 2005/0203940 A1 | 9/2005 | Farrar et al. | |
| 2009/0030888 A1* | 1/2009 | Sahu | G06F 16/24542 |
| 2010/0125565 A1* | 5/2010 | Burger | G06F 16/24524 |
| | | | 707/713 |
| 2012/0072413 A1* | 3/2012 | Castellanos | G06F 16/217 |
| | | | 707/718 |
| 2013/0054568 A1* | 2/2013 | Chen | G06F 16/24542 |
| | | | 707/714 |
| 2016/0034530 A1 | 2/2016 | Nguyen et al. | |
| 2016/0378822 A1 | 12/2016 | Jovanovic et al. | |
| 2018/0089271 A1 | 3/2018 | Kosuru et al. | |
| 2018/0314735 A1* | 11/2018 | Liu | G06F 16/217 |
| 2019/0384845 A1* | 12/2019 | Saxena | G06F 16/24545 |
| 2020/0073986 A1* | 3/2020 | Purcell | G06F 16/21 |

OTHER PUBLICATIONS

"Keras: The Python Deep Learning library", Retrieved from https://keras.io/, Retrieved Date: Oct. 29, 2018, 5 Pages.

"Machine Learning for .NET", Retrieved from https://github.com/dotnet/machinelearning, May 7, 2018, 3 Pages.

"Program for TPC-H Data Generation with Skew", Retrieved from https://www.microsoft.com/en-us/download/details.aspx?id=52430, Dec. 5, 2016, 06 Pages.

"Scikit-learn: Machine Learning in Python", Retrieved from https://scikit-learn.org/stable/, Retrieved Date: Oct. 29, 2018, 3 Pages.

"TPC Benchmark DS: Standard Specification v2.6.0", Retrieved from: http://www.tpc.org/tpcds/, Nov. 25, 2017, 1 Page.

"TPC Benchmark H: Standard Specification v2.17.3", Retrieved from http://www.tpc.org/tpch/default.asp, Oct. 29, 2018, 1 Page.

"Umbraco uses Azure SQL Database to quickly provision and scale services for thousands of tenants in the cloud", Retrieved From http://customers.microsoft.com/en-us/story/umbraco-uses-azure-sql-database-to-quickly-provision-and-scale-services-for-thousands-of-tenants, Oct. 18, 2016, 8 Pages.

"With Azure, SnelStart has rapidly expanded its business services at a rate of 1,000 new Azure SQL Databases per month", Retrieved From https://customers.microsoft.com/pt-br/story/with-azure-snelstart-has-rapidly-expanded-its-business-services, Oct. 20, 2016, 8 Pages.

Abadi, et al., "TensorFlow: A System for Large-scale Machine Learning", In Proceedings of the 12th USENIX Conference on Operating Systems Design and Implementation, vol. 16, Nov. 2, 2016, pp. 265-283.

Agrawal, et al., "Database Tuning Advisor for Microsoft SQL Server 2005", In Proceedings of the 30th VLDB Conference, Aug. 2004, 12 Pages.

Agrawal, et al., "Integrating Vertical and Horizontal Partitioning into Automated Physical Database Design", In Proceedings of the ACM SIGMOD international conference on Management of data, Jun. 13, 2004, 12 Pages.

Akdere, et al., "Learning-Based Query Performance Modeling and Prediction", In Proceedings of the IEEE 28th International Conference on Data Engineering, Apr. 1, 2012, pp. 390-401.

Aken, et al., "Automatic database management system tuning through large-scale machine learning", In Proceedings of ACM International Conference on Management of Data, May 9, 2017, pp. 1009-1024.

Alagiannis, et al., "H2O: a hands-free adaptive store", In Proceedings of the ACM SIGMOD International Conference on Management of Data, Jun. 18, 2014, pp. 1103-1114.

Arulraj, et al., "Bridging the archipelago between row-stores and column-stores for hybrid workloads", In Proceedings of the International Conference on Management of Data, Jun. 26, 2016, pp. 583-598.

Bishop, Christopher M., "Pattern Recognition and Machine Learning", By Springer, Fifth Edition, Jan. 2007, pp. 137-152.

Borovica, et al., "Automated Physical Designers: What You See is (Not) What You Get", In Proceedings of the Fifth International Workshop on Testing Database Systems, May 21, 2012, 6 Pages.

Breiman, Leo, "Bagging predictors", In Journal of Machine learning, vol. 24, Issue 2, Aug. 1, 1996, pp. 123-140.

Brown, et al., "Goal-oriented Buffer Management Revisited", In Proceedings of the ACM SIGMOD international conference on Management of data, Jun. 4, 1996 pp. 353-364.

Bruno, et al., "An Online Approach to Physical Design Tuning", In Proceedings of IEEE 23rd International Conference on Data Engineering, Apr. 15, 2007, 10 Pages.

Bruno, et al., "Physical design refinement: The 'merge-reduce' approach", In Journal of ACM Transactions on Database Systems, vol. 32, Issue 4, Nov. 1, 2007, 41 Pages.

Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.

Chaudhuri, et al., "AutoAdmin "what-if" index analysis utility", In Proceedings of the ACM SIGMOD international conference on Management of data, vol. 27, Issue 02, Jun. 1, 1998, pp. 367-378.

Chaudhuri, et al., "Self-tuning database systems: A decade of progress", In Proceedings of 33rd International Conference on Very Large Data Bases, Sep. 23, 2007, pp. 3-14.

Chen, et al., "Xgboost: A scalable tree boosting system", in ACM SIGKDD Conference on Knowledge Discovery and Data Mining, Aug. 13, 2016, pp. 785-794.

Curino, et al., "Schism: a Workload-Driven Approach to Database Replication and Partitioning", In Proceedings of the VLDB Endowment, vol. 3, Issue 1-2, Sep. 1, 2010, 10 Pages.

Dageville, et al., "Automatic SQL Tuning in Oracle 10g", In Proceedings of the Thirtieth international conference on Very large data bases, vol. 30, Aug. 31, 2004, pp. 1098-1109.

Dash, et al., "CoPhy: A Scalable, Portable, and Interactive Index Advisor for Large Workloads", In Proceedings of the VLDB Endowment, vol. 4, Issue 6, Mar. 1, 2011, pp. 362-372.

Ding, et al., "Plan Stitch: Harnessing the Best of Many Plans", In Proceedings of the VLDB Endowment, vol. 11, Issue 10, Jun. 1, 2018, pp. 1123-1136.

Duggan, et al., "Packing Light: Portable Workload Performance Prediction for the Cloud", In IEEE 29th International Conference on Data Engineering Workshops, Apr. 8, 2013, 8 Pages.

Duggan, et al., "Performance prediction for concurrent database workloads", In Proceedings of the ACM SIGMOD International Conference on Management of data, Jun. 12, 2011, pp. 337-348.

Dziedzic, et al., "Columnstore and B+ tree—Are Hybrid Physical Designs Important ?", In Proceedings of the International Conference on Management of Data, May 27, 2018, pp. 177-190.

Finkelstein, et al., "Physical Database Design for Relational Databases", In Journal of ACM Transactions on Database Systems, vol. 13, Issue 1, Mar. 1, 1988, pp. 91-128.

Ganapathi, et al., "Predicting Multiple Metrics for Queries: Better Decisions Enabled by Machine Learning", In Proceedings of IEEE 25th International Conference on Data Engineering, Mar. 29, 2009, pp. 592-603.

Goodfellow, et al., "Deep Learning", In Publication of MIT Press, Nov. 18, 2016, pp. 351-354.

Haertel, et al., "Return on Investment for Active Learning", In Proceedings of the NIPS Workshop on Cost-Sensitive Learning, Dec. 13, 2008, 8 Pages.

He, et al., "Deep residual learning for image recognition", In Proceedings of IEEE Conference on Computer Vision and Pattern Recognition, Jun. 27, 2016, pp. 770-778.

He, et al., "Delving Deep into Rectifiers: Surpassing Human-Level Performance on ImageNet Classification", In Proceedings of the IEEE international conference on computer vision, Dec. 7, 2015, pp. 1026-1034.

Hornik, Kurt, "Approximation capabilities of multilayer feedforward networks", In Journal of Neural networks, vol. 4, Issue 2, Jan. 1, 1991, pp. 251-257.

(56) References Cited

OTHER PUBLICATIONS

Hornik, et al., "Multilayer feedforward networks are universal approximators", In Journal of Neural networks, vol. 2, Issue 5, Jan. 1, 1989, 13 Pages.

Idreos, et al., "Adaptive indexing in modern database kernels", In Proceedings of the 15th International Conference on Extending Database Technology, Mar. 27, 2012, pp. 566-569.

Idreos, et al., "Database Cracking", In Proceedings of 3rd Biennial Conference on Innovative Data Systems, Jan. 1, 2007, 11 Pages.

Idreos, et al., "Merging what's cracked, cracking what's merged: adaptive indexing in main-memory column-stores", In Proceedings of the VLDB Endowment, vol. 4, Issue 9, Jun. 1, 2011, pp. 585-597.

Idreos, et al., "The Data Calculator: Data Structure Design and Cost Synthesis from First Principles and Learned Cost Models", In Proceedings of the International Conference on Management of Data, May 27, 2018, pp. 535-550.

Ivanovic, Vladimir, "Improved Automatic Tuning boosts your Azure SQL Database Performance", Retrieved from: https://azure.microsoft.com/en-in/blog/improved-automated-tuning-sql-database-advisor/, Sep. 6, 2016, 6 Pages.

Ke, et al., "LightGBM: A Highly Effcient Gradient Boosting Decision Tree", In Proceedings of 31st Annual Conference on Neural Information Processing Systems, Dec. 4, 2017, 3149-3157.

Kester, et al., "Access Path Selection in Main-Memory Optimized Data Systems: Should I Scan or Should I Probe?", In Proceedings of the ACM International Conference on Management of Data, May 9, 2017, 16 Pages.

Kingma, et al., "Adam: A method for stochastic optimization", In Journal of the Computing Research Repository, Dec. 22, 2014, pp. 1-15.

Kraska, et al., "The Case for Learned Index Structures", In Proceedings of the International Conference on Management of Data, May 27, 2018, 489-504.

Leis, et al., "How Good Are Query Optimizers, Really?", In Proceedings of the VLCB Endowment, vol. 9, Issue 3, Nov. 1, 2015, pp. 204-215.

Leis, et al., "The Adaptive Radix Tree: ARTful Indexing for Main-memory Databases", In Proceedings of the IEEE International Conference on Data Engineering, Apr. 1, 2013, 12 Pages.

Li, et al., "Robust Estimation of Resource Consumption for SQL Queries Using Statistical Techniques", In Proceedings of the VLDB Endowment, vol. 5, Issue 11, Jul. 1, 2012, pp. 1555-1566.

Lohman,, Guy, "Is Query Optimization a "Solved" Problem?", In Proceedings of Workshop on Database Query Optimization, Apr. 10, 2014, 6 Pages.

Mussmann, et al., "On the Relationship between Data Efficiency and Error for Uncertainty Sampling", Proceedings of the 35th International Conference on Machine Learning, Jun. 15, 2018, 22 Pages.

Pavlo, et al., "Self-driving database management systems", In Proceedings of 8th Biennial Conference on Innovative Data Systems Research, vol. 4, Jan. 8, 2017, 6 Pages.

Pratt, Lorien Y., "Discriminability-Based Transfer between Neural Networks", In Proceedings of Advances in Neural Information Processing Systems, Nov. 30, 1992, pp. 204-211.

Raik-Allen, Simon, "MYOB", Retrieved From https://azure.microsoft.com/en-us/case-studies/customer-stories-myob/, Dec. 13, 2013, 6 Pages.

Raman, et al., "Learning to Diversify from Implicit Feedback", In WSDM Workshop on Diversity in Document ,Jan. 1, 2012, 6 Pages.

Rao, et al., "Automating Physical Database Design in a Parallel Database", In Proceedings of the ACM SIGMOD international conference on Management of data, Jun. 3, 2002, 12 Pages.

Schnaitter, et al., "COLT: continuous on-line tuning", In Proceedings of the ACM SIGMOD international conference on Management of data, Jun. 27, 2006, 3 Pages.

Settles, Burr, "Active Learning Literature Survey", In Technical Report 1648 of Computer Sciences, University of Wisconsin—Madison, Jan. 26, 2010, pp. 1-67.

Sharma,, "The Case for Automatic Database Administration using Deep Reinforcement Learning", In Journal of Computing Research Repository, Jan. 17, 2018, 9 Pages.

Shen, et al., "Active Feedback in Ad Hoc Information Retrieval", In Proceedings of the 28th annual international ACM SIGIR conference on Research and development in information retrieval, Aug. 15-19, 2005, pp. 59-66.

Srivastava, et al., "Training Very Deep Networks", In Proceedings of the 28th International Conference on Neural Information Processing Systems, vol. 2, Dec. 7, 2015, 9 Pages.

Stillger, et al., "LEO-DB2's Learning Optimizer", In Proceedings of the 27th International Conference on Very Large Data Bases, vol. 1, Sep. 11, 2001, 10 Pages.

Stonebraker,, Michael, "The choice of partial inversions and combined indices", In International Journal of Parallel Programming, vol. 3, Issue 2, Jun. 1, 1974, pp. 167-188.

Storm, et al., "Adaptive Self-Tuning Memory in DB2", In Proceedings of the 32nd International Conference on Very Large Data Bases, Sep. 1, 2006, pp. 1081-1092.

Valentin, et al., "DB2 Advisor: An Optimizer Smart Enough to Recommend Its Own Indexes", In Proceedings of 16th International Conference on Data Engineering, Feb. 28, 2000, 10 Pages.

Weikum, et al., "Self-tuning database technology and information services: From wishful thinking to viable engineering", In Proceedings of 28th International Conference on Very Large Data Bases, Jan. 1, 2002, 12 Pages.

Wu, et al., "Predicting query execution time: Are optimizer cost models really unusable?", In Proceedings of IEEE 29th International Conference on Data Engineering, Apr. 8, 2013, 18 Pages.

Xu, et al., "Incorporating Diversity and Density in Active Learning for Relevance Feedback", In European Conference on Information Retrieval, Apr. 2, 2007, 12 Pages.

Yosinski, et al., "How transferable are features in deep neural networks?", In Proceedings of 27th Annual Conference on Neural Information Processing Systems, Dec. 8, 2014, pp. 1-9.

Zahir, et al., "A Recommendation System for Execution Plans Using Machine Learning", In Journal of Mathematical and Computational Applications, vol. 21, Issue 2, Jun. 15, 2016, 13 Pages.

Zilio, et al., "DB2 Design Advisor: Integrated Automatic Physical Database Design", In Proceedings of the 30th VLDB Conference, vol. 30, Aug. 31, 2004, pp. 1087-1097.

"Query Optimizer Concepts", Retrieved from: https://docs.oracle.com/database/121/TGSQL/tgsql optcncpt.htm#TGSQL192, Jul. 2017, 23 Pages.

"International Search Report and Written Opinion Issued in PCT Patent Application No. PCT/US20/015509", dated May 7, 2020, 11 Pages.

Leis, et al., "How Good Are Query Optimizers, Really?", In Proceedings of the VLDB Endowment, vol. 9, Issue 3, Nov. 1, 2015, pp. 204-215.

Stillger, et al., "LEO—DB2's Learning Optimizer", In Proceedings of the 27th International Conference on Very Large Data Bases, volume 1, Sep. 11, 2001, 10 Pages.

\* cited by examiner

LEVERAGING QUERY EXECUTIONS TO IMPROVE INDEX RECOMMENDATIONS

TECHNICAL FIELD

Embodiments described herein generally relate to configuring indexes of databases, specifically using artificial intelligence to identify optimal index configurations.

BACKGROUND

A query is used to retrieve data from a database. A database may be configured with indexes to improve speed and ease of retrieving data from the database. There are two types of processing involved in performing a query, which may be considered the execution cost. The first type is the speed and ease of retrieving data (reading and writing to the data storage) and the second is executing the computations of the query. Different index configurations may result in better or worse performance, or execution cost, for executing a query.

State-of-the-art index advisors rely on cost estimates from a query optimizer to search for the index configuration recommendations with the highest estimated performance improvements. Due to limitations with estimates from a query optimizer, a significant number of cases have shown that an index configuration recommendation that was estimated to improve the execution cost (e.g., CPU time) of a query instead is worse when implemented. Such errors are a major impediment for automated indexing in production systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Selecting an appropriate set of indexes, or index configuration, for a given workload can result in significant reductions in query execution costs (e.g., CPU (central processing unit) time). A process to automate index recommendations may be a significant value-add for both on-premise and cloud database platforms with diverse databases and changing workloads. A key requirement of an automated index tuning and implementation system, in production scenarios, is that creating or dropping indexes should improve query execution costs. Any significant query performance regression, where a query's execution cost increases after a change in index configuration, may cause serious disruptions. Query performance regression is a major impediment in fully-automated index tuning and implementation.

A machine learning model may be used to predict execution cost based on execution history, which then may be used by an index tuner to replace the estimated cost of the optimizer. However, due to the huge diversity of queries, data distributions, physical operator types, and index types, performing the data collection task to train an accurate ML model is challenging. Many existing approaches for cost predictions report significant errors when the prediction is compared to the true execution cost. Thus, these existing approaches may not prevent query regressions in an end-to-end index recommendation.

An assumption for many ML models to perform well is that the training and testing data follow the same data distribution in the feature space. This assumption does not necessarily hold as there are differences in training and testing distributions across databases and even within a database across queries. In addition, in production database systems, as new execution data is collected, the offline models, or non-production ML models, are periodically retrained with new data and redeployed. However, given the scale of the infrastructure to retrain, the retraining and redeployment may be infrequent. Thus, a model that quickly adapts to new execution data for a database is helpful for auto-indexing which continuously tunes the index configuration.

The following systems and techniques may be implemented with index tuners to effectively leverage machine learning (ML) techniques to improve index recommendation quality and automate index tuning implementation. In addition, the systems and techniques may adapt an ML model for different data distributions and actively acquire execution data that may best improve ML models under a given budget.

Figure 1:
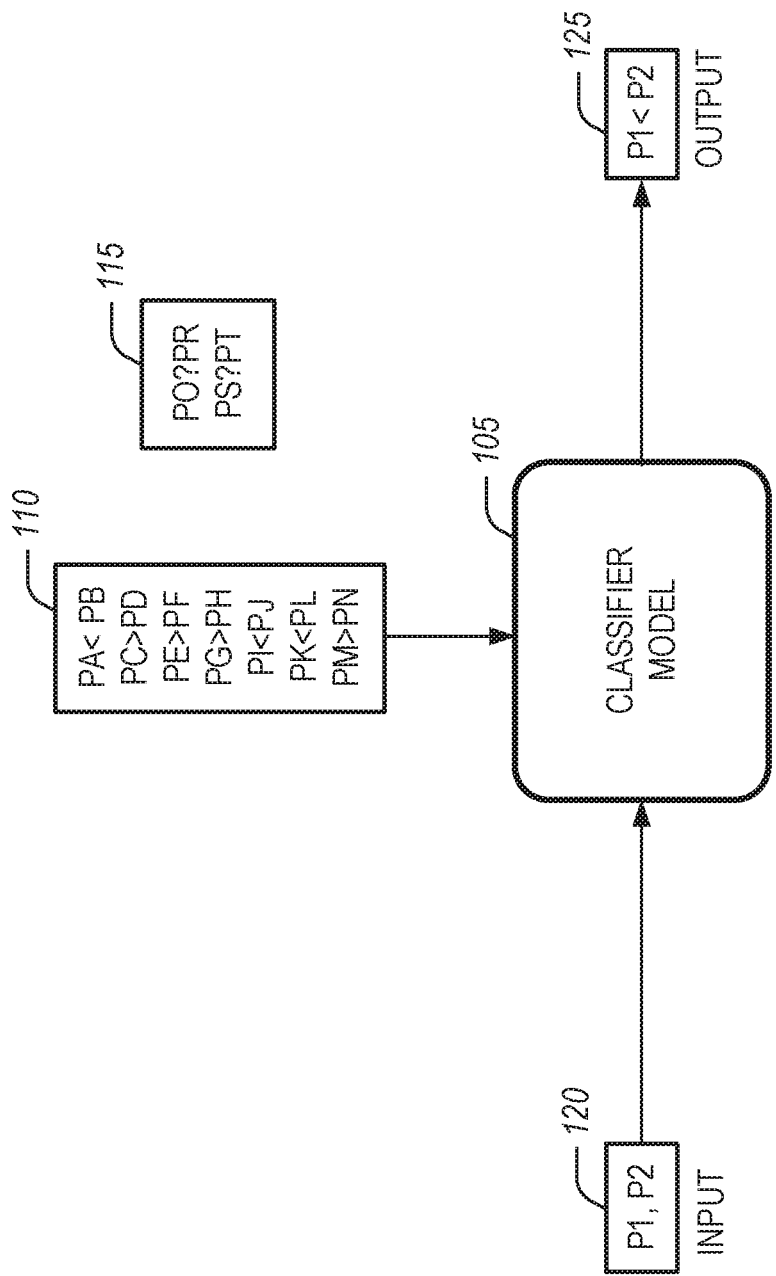
FIG. 1 is an illustration of an example of a ML (machine learning) model training and inference for predicting a cost efficiency ranking of two query plans for a database, in accordance with some embodiments.

FIG. 1 is an illustration of an example 100 of a ML model training and inference for predicting a cost efficiency ranking of two query plans for a database, in accordance with some embodiments. The ranking may indicate one query plan is more cost efficient than the other query plan of the two query plans, or it may indicate the cost efficiency different is indeterminable and thus the ranking may indicate that a more cost efficient query plan is indeterminable or unsure. Cost efficiency may be defined differently depending on restrictions present for executing a query plan. For example, the cost may include, but not limited to, the central processing unit (CPU) execution cost or number of cycles, the amount of time required to execute a query with the query plan, or the amount of physical or logical input/output to the database. The example 100 may include a classifier model 105. The classifier model 105 may receive as training input a set 110 of query plan pairs and an indication for each pair of which query plan is more cost efficient. The set 110 of training input may be collected from execution data of a query using the configurations specified by different query plans. The cost value determined from the execution of the query using a respective query plan, such as CPU cycles or time, may then be used to compare two query plans for a pair of query plans. Based on the comparison of cost values of the pair of query plans, the indication of the more cost efficient query plan, of the pair of query plans, may be determined and recorded for input to the ML model for training. If the cost efficiency between the two query plans is indeterminable or is an insignificant difference, then the pair of query plans may be classified as an unsure set 115 and not used as training data for the classifier model 105.

For the set 110 of training input PA and PB represent two different query plans. For a given pair of query plans, a "<" indicates that the second query plan is more efficient that the first query plan, such as "PA<PB". Consequently, a ">" indicates that the first query plan is more efficient than the second query plan, such as "PC>PD". Finally, the unsure set 115 includes query plan pairs where it was indeterminant with query plan was more efficient, and thus are marked with a "?", such as "PO?PR".

Once the classifier model 105 is trained, an inference may be made. The classifier model 105 may receive as input a pair of query plans 120. Based on the training, the classifier model may produce an output 125 that indicates the which of the two query plans of the pair of query plans 120 is more cost efficient than the other. For example, the output 125 indicates that query plan P2 is more cost efficient than query plan P1.

The cost comparison may be a classification task in ML. Training a classifier to directly minimize the error in deciding which plan has cheaper execution cost among a pair of plans may result in higher accuracy compared with using a model (analytical or learned) that predicts an execution cost. As comparison, a regression model may be trained to minimize the prediction error of an individual query plan's cost instead of in comparing the cost of two query plans.

As predictions on the costs of a pair of plans are independently made with the regression model, predictions which have errors in opposite direction may add up when identifying the cheaper plan and result in an incorrect identification of the more cost-efficient query plan.

The classification task may be performed in the following manner. Given two query plans P1 and P2 for a query Q chosen by the query optimizer under configurations C1 and C2, the objective is to determine if P2 is cheaper or more expensive in execution cost compared to P1. Given configurable thresholds $\alpha 1>0$, $\alpha 2>0$, P2 is more expensive if ExecCost (P2)>$(1+\alpha 1)$×ExecCost (P1) and cheaper if ExecCost (P2)<$(1-\alpha 2)$×ExecCost (P1). In some embodiments, $\alpha 1$ and $\alpha 2$ may be set such that $\alpha 1=\alpha 2=\alpha$. The value of $\alpha$ is set to specify the significance of the change, such as 0.2.

Figure 2:
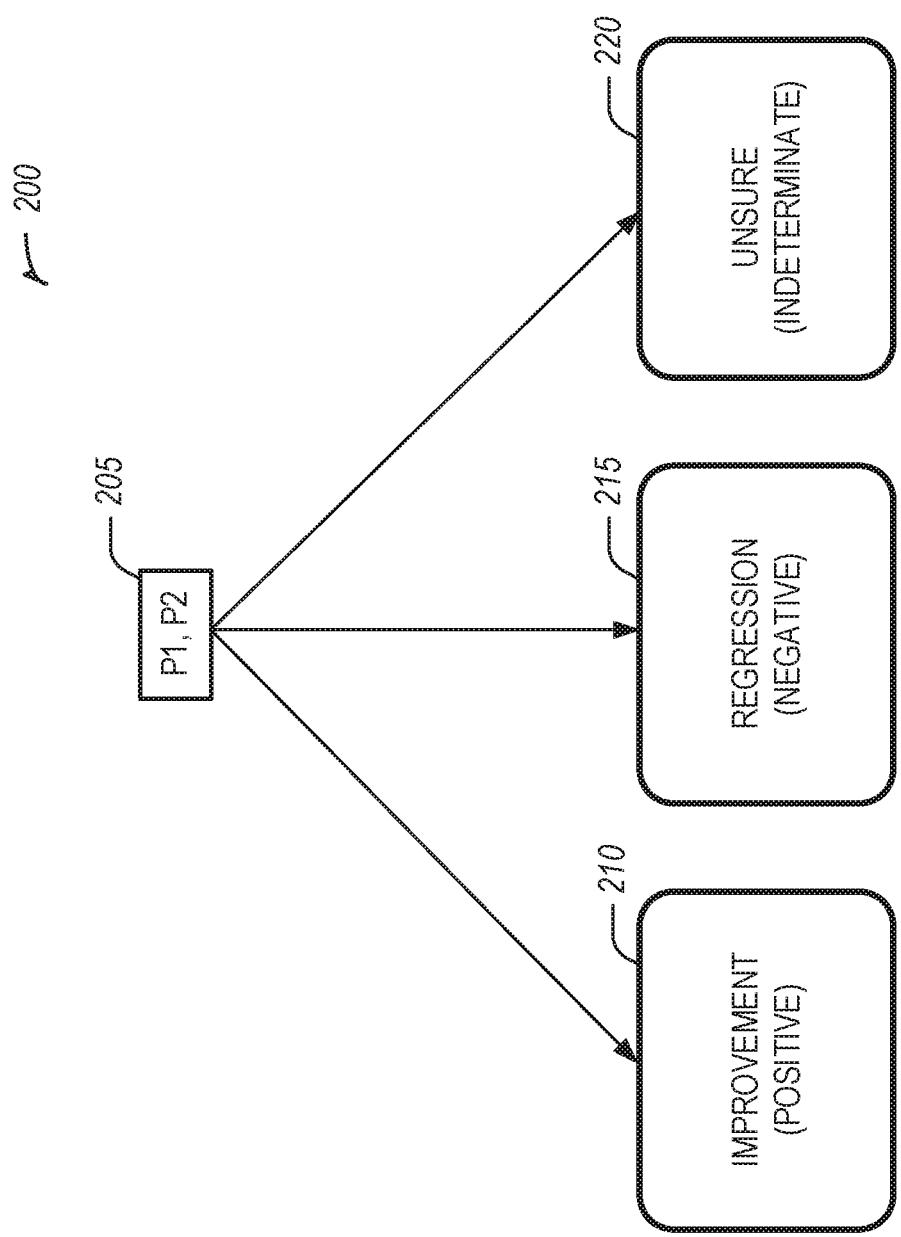
FIG. 2 illustrates an example ternary classifier that may be used to classify the pair of query plans, in accordance with some embodiments.

FIG. 2 illustrates an example ternary classification 200 that may be used to classify the pair of query plans, in accordance with some embodiments. Given a pair of query plans 205, (P1, P2), the pair may be classified in one of three ways. The pair of query plans 205 may be assigned a label of a regression (negative) label 215 if P2 is more expensive than P1. The pair of query plans 205 may be assigned a label of an improvement (positive) label 205 if P2 is cheaper than P1. The pair of query plans 205 may be assigned a label of unsure otherwise. In the context of query plans, regression refers to a query plan that is less efficient than another query plan. This unsure class corresponds to where the difference in execution cost is predicted to be insignificant or indeterminable. While a binary classifier that flags regression or non-regression may be used, a ternary classifier may be elected for removing the unsure data set which may result in clearer definitions for the ML model and more accurate results.

A label may be assigned to a query plan pair by comparing the logical execution cost of the query plans, such as the CPU time spent or number of bytes processed. This may be proportional to a query plan's resource consumption and a measure of plan quality. Logical execution cost may be more robust to runtime effects, such as concurrency, compared with a physical measure (e.g., query latency). Due to natural measurement variance or different parameters for a query plan, a robust statistical measure, e.g., the median over several executions, may be used to assign the label.

Figure 3:
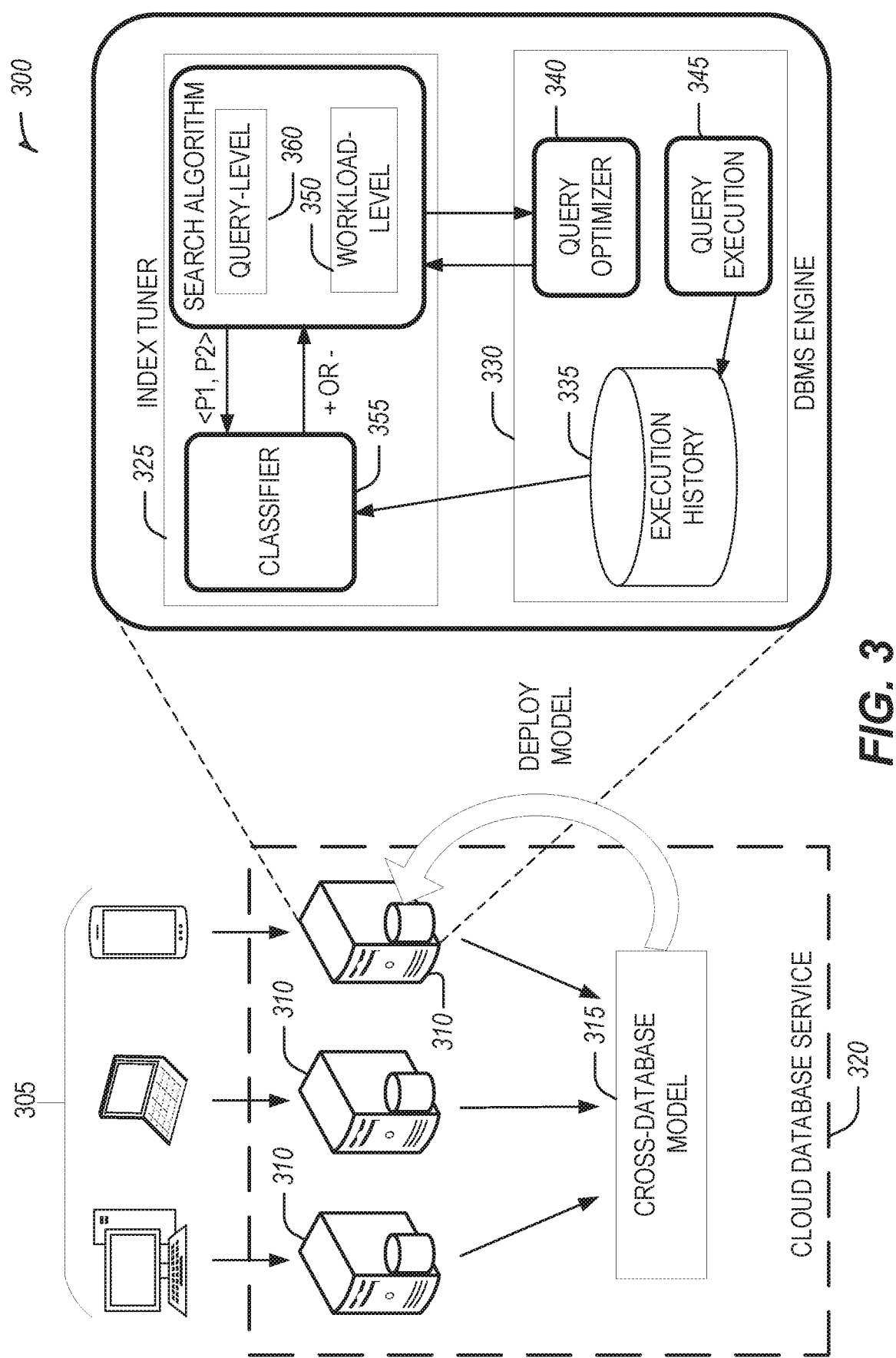
FIG. 3 illustrates an example of an end-to-end architecture of index tuning in a cloud database setting, in accordance with some embodiments.

FIG. 3 illustrates an example 300 of an end-to-end architecture of index tuning in a cloud database setting, in accordance with some embodiments.

Computing devices 305 may make application requests to databases 310, which may be part of a cloud database service 320. Databases 310 may emit aggregated query plan execution statistics which may be collected through telemetry at a database such as an Azure SQL database. The telemetry data may be used to train a cross-database model 315. The statistics may vary based on the application. These query plan execution statistics include the plans for the same query from different index configurations, which occur as indexes are changed by human administrators or automated services.

The ML model, or deploy model, may be trained with this execution history data 335 from query executions 345 of the DBMS Engine 330. P1 and P2 may be query plans for a query. This architecture may be independent of the model type (e.g.: random forest, deep neural networks). The index tuner 325 may be provided a database, a workload, an initial configuration, and a set of constraints such as the maximum number of indexes or a storage budget to then recommend a new configuration, that reduces the total query optimizer-estimated cost.

The index tuner 325 may search in two phases. The first phase may be a query level 360 search to find the optimal index configuration for each query in the workload. The second phase may be a workload-level 350 search to find the optimal index configuration by enumerating different sets of indexes obtained from the query-level 360 optimal configurations. The index tuner 325 may use the "what-if" API of the query optimizer 340 to simulate hypothetical configurations and obtain a query plan for a query that the query optimizer 340 may choose if the configuration is implemented. The index tuner 325 may use the estimated query plan costs of the query optimizer 340 to find the cheapest configuration. Instead of using the query optimizer 340 estimated cost to compare query plans, the classifier model 355 may be used to compare query plans. The classifier model 355 may receive the query plan pair of P1 and P2. The classifier model 355 may infer which query plan is the most cost efficient.

The input to the classification task is a pair of query plans, where each query plan is a tree of operators indicating the indexes the query needs to access the data, which may be a subset of indexes in a configuration, and execution of the query. The tree is composed of a series of nodes. The nodes of the tree may represent physical operators, where a physical operator is how the database engine may execute a logical expression of the query. The pair of query plans may be converted into feature vectors for the purpose of classification in the ML model. The feature vectors may encode the following types of information that provide information for the model to learn the classification task.

The first type may be the measure of work done. The measure of work done may be the query optimizer's estimate for a node's cost or the number of rows processed by a node. The second type may be the structure of the plans. Structural information, such as the join orders or the position of an operator in the query plan, may be useful, especially when comparing two query plans for the same query. This may allow the classifier to potentially learn patterns where certain transformations (such as join re-ordering) that the optimizer performs across two query plans may lead to cheaper or more expensive plans. The third type may be the physical operator details. Physical operators in a plan may play a role in the cost. For instance, a nested loop join may have different costs compared to a merge join even if they correspond to the same logical join operation.

A query plan is a tree of physical operators to perform the query, such as Index Scan, Table Scan, Hash Join. The physical operators may be the feature dimensions or attributes. Two additional properties of physical operators are relevant to execution cost: (a) parallelism: whether the operator is single-threaded (serial) or multi-threaded (parallel); and (b) execution mode: whether the operator processes one row at a time or a batch of data items in a vectorized manner. Each physical operator is assigned a key which includes the parallelism property and the execution mode property.

For a given query plan, a value is assigned to each key which: (i) measures of the amount of work done by the corresponding operators in the plan; (ii) encodes the plan structure. For a plan with multiple operators having the same key, the values assigned to the key are summed. If an operator does not appear in a plan, its corresponding key is set to 0, thus allowing a fixed dimensionality of the vector. Different ways of assigning a value to an operator encodes different information and creates different feature channels. A feature channel may be a representation of different aspects of query plans which identifies how the query plan is configured and how it will execute. Table 1 lists the different feature channels, how the weights are computed, and what information it encodes. Each channel may have the same dimensionality. The optimizer-estimated plan cost may be a feature.

TABLE 1

| Channel | Description |
| --- | --- |
| EstNodeCost | Estimated node cost as node weight (work done). |
| EstRowsProcessed | Estimated rows processed by a node as its weight (work done). |
| EstBytesProcessed | Estimated bytes processed by a node as its weight (work done). |
| EstRows | Estimated rows output by a node as its weight (work done). |
| EstBytes | Estimated bytes output by a node as its weight (work done). |
| LeafWeightEst-RowsWeightedSum | Estimated rows as leaf weight and weight sum as node weight (plan structure). |
| BytesWeightedSum | weight sum as node weight (plan structure). |

Table 1 is an example of various ways to encode the amount of work done by a physical operator, such as using the optimizer's estimate of the node's cost (EstNodeCost) or the estimated bytes processed by the node (EstBytesRead). A weight may be applied to each node. For example, each leaf node may have a weight calculated by the estimated number of rows (or bytes) output by the node and a height, where the height may be calculated by starting with 1 for the leaves and incremented by 1 for each inner level above the leaf in the tree. The value of a node is the sum of weight× height of all its children.

For example, a query plan may join three tables and return the result. The query plan may execute as single-threaded and in row mode. The query plan may be represented as a tree with each node annotated with the physical operator used and optimizer-estimated measures, such as estimated node cost and estimated rows. A feature may be calculated for one of the channels using the raw values obtained from the plan. For example, the EstNodeCost channel, may use the optimizer-estimated node cost as the weight and sums the weights if the same key appears multiple times in the plan. For instance, the keys <Scan_Row_Serial> and <HashJoin_Row_Serial> may appear for two operators and thus the weight for these keys is the sum of the weights from each operator.

Once the individual plans are featurized, the features are combined to encode a pair of plans <P1, P2>. A key aspect of this combination may be that the classifier is conceptually learning to find the difference between the plans. As an example, a simple mathematical transformation may be computing an attribute-wise difference among the corresponding channels from P1 and P2. For example, a difference between P1 and P2 may be determined using the EstNodeCost and LeaflVeightEstRowsWeightedSum channels.

The ML model techniques used to train the classifier to predict regression and improvement classes may use query execution data collected from several databases in a cloud platform, such as Azure SQL Database. A featurization technique may be used to convert the pair of query plans into a vector which is then used by the ML model technique.

A ML model may be tested and trained using one database, but then for production purposes or portability may be used with a different database. But for the model to provide accurate results for the new database, it may need to be complement retrained using data from the new database. Thus, techniques which may provide for adaptability and portability of the ML model without complete retraining may be beneficial.

Three main reasons may exist for differences between databases. First, in a cloud platform where a large variety of new applications may be deployed every day, the execution data on a new database may be completely different from that observed for existing databases. Second, within a database, there may be diversity in the types of queries executed (e.g., the joins, predicates, aggregates, etc.). Third, even with databases where several plans of a query have executed, these plans may represent a small fraction of the alternatives considered during the index tuner's search. For complex queries, the index tuner may explore hundreds of different configurations that may result in tens of very different plans. Thus, the feature vector representations of these unseen plans may be significantly different from the executed ones.

An example method to generate a model for a new, or local database is to first separately learn a local model with execution data only from that database. The local model may be lightweight and trained with query plans of the order of hundreds or few thousands. The local model may then be adapted with the previously trained model. As more execution data becomes available, the local model is more customized towards that database and predicts more accurately.

Three approaches may be used to adapt a model with a local model for use with a new or local database. The first approach may be a nearest neighbor approach that checks if the local model has trained on data points in the neighborhood, or in the relative feature space, of a data point in the model. Training on labeled data points in the neighborhood of the data points in the model may increase the likelihood of the local model making a correct prediction; otherwise, the model may be used.

The second approach may be an uncertainty approach that compares the uncertainty in predictions from the local and offline models, and picks the prediction with lower uncertainty. The models may be configured to produce a certainty value with each query plan pair prediction. The level of certainty is then evaluated between the local model and the offline model to determine which produced a prediction with a higher certainty value. The implication being that higher certainty implies a higher probability of making a correct prediction.

The third approach is a meta model approach where a meta model is trained that that uses the predictions from both the offline model and local model, along with the uncertainty and neighborhood signals to output the final prediction. Local execution data collected on the local database is used to train the meta model $M_{meta}$. The local data points are split into two disjoin sets of data points $D_l$ and $D_m$. The $D_l$ set is used to train the local model ($M_{local}$) and the $D_m$ set is used to train the meta model ($M_{meta}$). The model M may be trained with execution data from other databases. Meta features for each data point d in $D_m$ may be extracted, such as the predictions of M and $M_{local}$ for a given data point d, the corresponding uncertainties for data point d, and the distances and labels of close neighbors of d in $D_t$. The meta model may be trained using $D_m$, such as with Random Forest. Both $M_{local}$ and $M_{meta}$ may be adaptively retrained as new plans are collected for the database.

Figure 4:
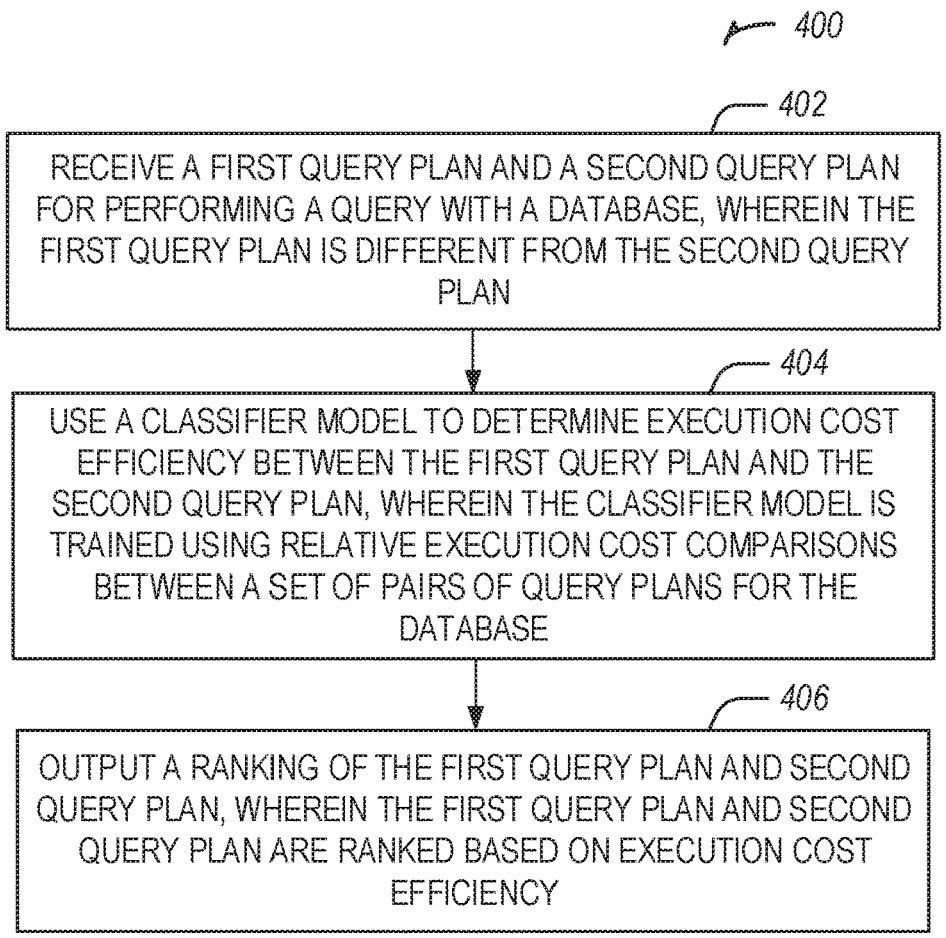
FIG. 4 illustrates a flowchart showing a technique for determining a ranking based on cost efficiency for a pair for query plans, according to some embodiments.

FIG. 4 illustrates a flowchart showing a technique 400 for determining a ranking based on cost efficiency for a pair for query plans, according to some embodiments. Cost efficiency may be defined differently depending on restrictions present for executing a query plan. For example, the cost may include, but not limited to, the CPU execution cost or number of cycles, the amount of time required to execute a query with the query plan, or the number of physical or logical input/output with the database. The technique 400 includes an operation 402 to receive a first query plan and a second query plan for performing a query with a database. The first query plan may be different from the second query plan, for example, the first query plan may be based on a first index configuration for the database and the second query plan may be based on a second index configuration for the database.

The technique 400 includes an operation 404 to use a classifier model to determine execution cost efficiency between the first query plan and the second query plan. The classifier model may be a ML model trained using relative execution cost comparisons between a set of pairs of query plans for the database. For example, the model may be provided a pair of query plans, Q1 and Q2. Based on an actual execution of each plan, it may be determined that Q1 requires less CPU cycles than Q2. The ML model may be provided the query plans Q1 and Q2 with the indication that Q1 is more efficient than Q2. For the query plans to be in a data form understandable by a ML model, a set of features may be identified for the set of pairs of query plans. A weight may be applied to each of the respective features of the set of features. A weight may be used to distinguish a feature that is considered more or less critical for the distinction of the query plan. The set of pairs of query plans may be converted into feature vectors using the respective set of features of each pair of query plans.

The classifier model may be originally trained using relative execution cost comparisons using a set of pairs of query plans of a second, or training, database. The set of pairs of query plans from the database may be less than the set of pairs of query plans from the training database. In other words, the classifier model may be trained using a large set of query plan pairs from the training database. The classifier model may then be used with the database, such as a production database, by performing additional training with a set of query plan pairs from the production database, where the number of query plan pairs in the set of query plans from the production database is less than the number of query plan pairs in the set of query plan pairs from the training database.

The training of the classifier model may include the use of weighting with the classifier model as a query plan pair with a higher weight value may be provide greater influence on the training of the classifier model than a query plan with less weight. The classifier model may be trained using a combination of the set of pairs of query plans of a first database, the set of pairs of query plans of a second database, and weight values associated with each respective pair of query plans. Different weights may be assigned to different data points to have different influence on the training of the model.

The technique 400 includes an operation 406 to output a ranking of the first query plan and second query plan. The first query plan and second query plan may be ranked based on execution cost efficiency. The output may include a certainty value indicating a confidence level of the classifier model for the ranking.

The technique 400 may further include operations to determine the first query plan is ranked as more cost efficient than the second query plan and select the first query plan based on the ranking that the first query plan is more cost efficient than the second query plan. The technique 400 may further include operations to configure the database based on the index configuration of the first query plan and execute a query of the database based on the first query plan.

In the arena of building ML models for predicting query performance, whether predicting if one query plan is more cost efficient than another query plan, or predicting the execution cost of a single query plan, building the ML models is an execution cost and time heavy process. The amount of resources available for collecting data to train a model may be limited. Thus, it may be essential to select the data which will contribute the best information for building a comprehensive ML model within the budget of resources for collecting the data.

The systems and techniques described herein identify data for labeling from a large pool of unlabeled data. This may be considered Active Learning (AL) problem for improving ML tasks.

A ML task in databases takes a data point x as input and tries to predict its label $f(x)$. The set of all data points is denoted by X with a given labeled training data set $X_T$. The ML task learns a ML model that may accurately approximate $f(x)$. A specific application of the ML task, such as query optimization or auto-indexing, may generate a pool of unlabeled data points that the ML model attempts to predict on. The prediction results are then fed back to the application to improve its performance. The quality of the ML model may be evaluated by a loss function, which denotes the loss of the model prediction compared to the true label function $f(x)$ when evaluated on data points.

The pool of unlabeled data points may be selected from a larger set of data points, as it is not possible in most scenarios to execute and train using all possible data points. The Al strategy is to select a subset of unlabeled data point from the larger set of possible data points that will then be executed to acquire their label, add them to the training set, and retrain or update the ML model. However, there may be a budget for the number of data point labels that may be collected, where the budget may be the amount of time, disk input/output, or execution cost available to execute the query plans associated with each data point in the subset. Thus, the goal of the AL strategy is to select the subset of data points, such that they minimize the ML model's loss for the rest of the unlabeled data in the larger set of possible data points with the given budget.

The systems and techniques described herein may be used to improve CPU time prediction (CTP) and plan regression prediction (PRP). The CTP task may take in a featurized query plan and outputs a real number that represents the estimated CPU time to execute the query plan. The PRP task may take in a featurized pair of query plans and outputs a class nominal that indicates whether the first query plan may require more CPU time than the second plan (positive) or not (negative).

As noted, a challenge of building an accurate ML model is collecting data points and their respective labels which will generate a more accurate ML model, but in many fields, such as query plan prediction, it may not be possible to collect all or a large number of data points and their labels. Thus, a budget may exist for what data points and labels may be collected for the ML model. A key element of the AL strategy may be the estimation of the cost to acquire the label for each data point. A query optimizer may be employed to estimate the cost to execute a query plan. In some embodiments, the query optimizer may be estimating or predicting the cost of the query plan, the same function as the ML model. The ML model may be trained to a level of accuracy and then used instead of the query optimizer to predict the cost of acquiring data point labels for additional training of the ML model.

As described herein, the AL strategy may be used for determining data points to generate labels for where the data points are query plans and the labels are the execution cost of the query plan. However, the AL strategy may be used with any ML model, especially when a budget may exist for acquiring data point labels. The AL strategy may be employed with the techniques described above for an ML model which predicts the more execution cost efficient query plan of a query plan pair. The AL strategy may be employed with ML models outside of queries and databases.

The AL strategy may include one, or any combination, of three principle strategies: informativeness, return on investment (ROI), and representativeness. An informativeness strategy estimates the informativeness of a data point. In other words, informativeness may indicate how much information or how accurate the information is for a label associated with a data point. Informativeness may provide the uncertainty of the data point to the ML model, the expected change the data point may bring to the ML model if labeled, or the expected error reduction of the ML model after the data is labeled. For example, uncertainty may be used to capture the informativeness of the data points. Uncertainty may describe how uncertain the ML model is to predict the data point. In classification tasks, the uncertainty score may be the probability that the data point does not belong to the predicted class. In regression tasks, the uncertainty score may be the output variance in its prediction. Any other proxy that captures such informativeness may be used replace the uncertainty.

An ROI strategy may include identifying the ratio between the informativeness measurement of the data point and the estimated cost to get the label of the data point. ROI may characterize the amount of information that the data point may bring per a cost unit, where a cost unit is a unit of what is used to measure the cost of acquiring the label, such as a CPU cycle or minute of time. ROI may be used as the probability weight to sample data points from the pool. A data point that has higher informativeness measurement and lower cost may have a higher ROI score. Thus, using ROI as the sampling weight may balance the informativeness and the cost of acquiring the label for data points.

The representativeness strategy, or clustering based pruning, selects data points that cover different regions in the pool of data points to avoid information redundancy. Clustering is a technique to divide the data points into different groups with similar data points in the same group. The representativeness strategy first applies a clustering technique to the data points in the pool before the sampling process. Then for each cluster, a maximum number of selected data points is enforced. This may vary from cluster to cluster, to avoid the redundancy during sampling. If the strategy samples a data point from a cluster that has already met the limit, the strategy will reject that sample to give data points in the unsaturated clusters a great possibility of selection, thus increasing the overall representativeness of the selected data points from the pool.

The threshold may be defined for each cluster as dependent on the properties of the data points in the cluster. Larger clusters may require more data points before information becomes redundant. However, the tipping-point may not linearly increase with the size of the cluster. This may indicate a diminishing return on the data points selected within the same cluster. Thus, a sub-modular function, $\gamma=\sqrt{n}$, may be used as the limit on each cluster through cross-validation, where n is the size of the cluster. The diminishing return may not apply to clusters with average uncertainty higher than the average uncertainty of the pool. Thus, the ln limit may not be enforced if the cluster's uncertainty is higher than a percentile-based threshold against the uncertainties of all the data in the pool. For example, the percentile threshold can be set to 70%, which has reasonably good performance on average based on cross-validation.

Figure 5:
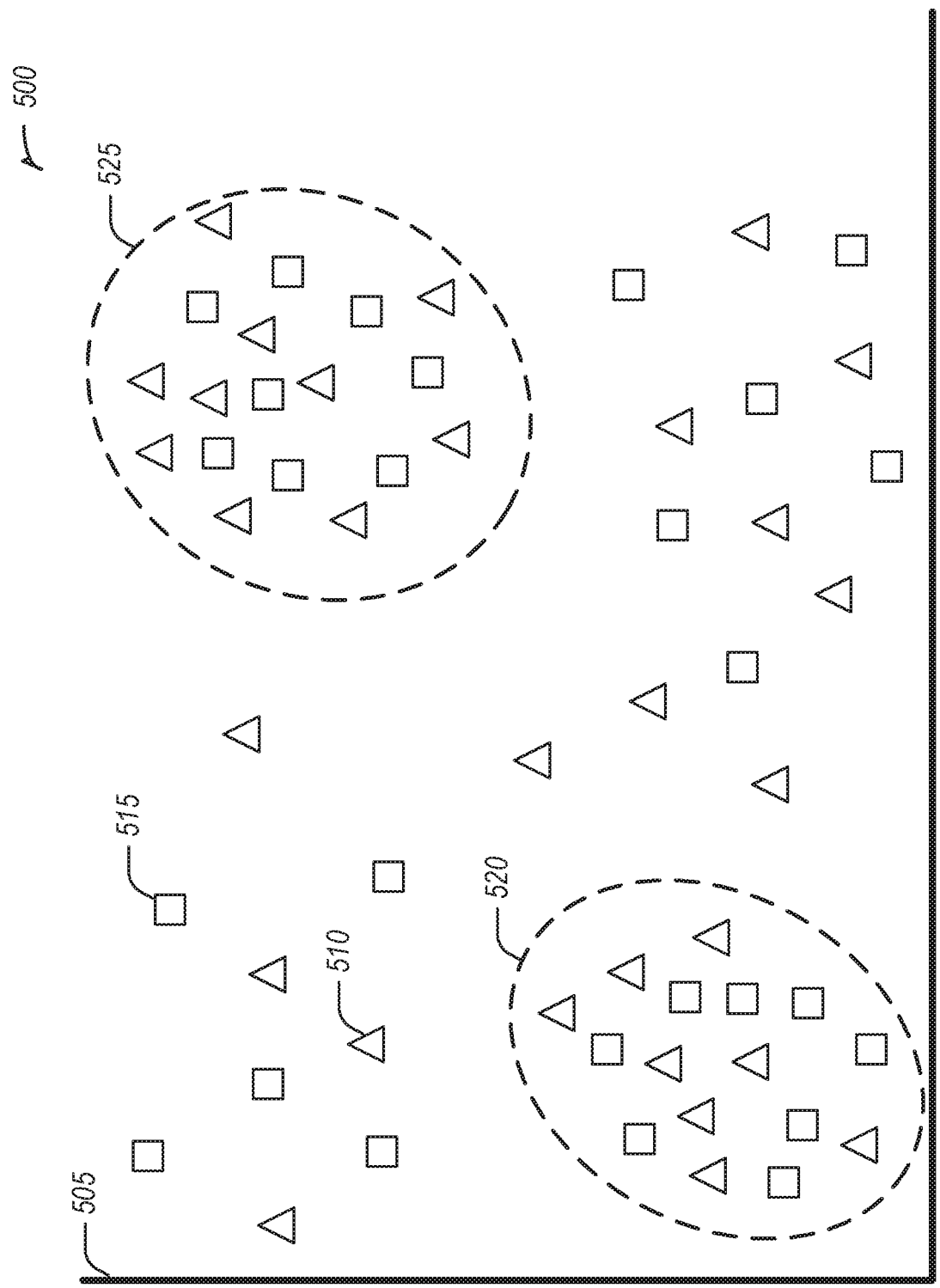
FIG. 5 illustrates an example of clustering data points, in accordance with some embodiments.

FIG. 5 illustrates an example 500 of clustering data points, in accordance with some embodiments. In the example 500, the field 505 may include unlabeled data points. In the example 500, a triangle data point represents an unselected data point, such as unselected data point 510. In the example 500, a square data point represents a selected data point, such as selected data point 515. In the field 505, data points are clustered in two areas, as designated by cluster 520 and cluster 525. Because of the high concentration of data points in cluster 520 and cluster 525, a high probability exists that a majority of data points may be selected from cluster 520 and cluster 525. This may result in a training data set which does not properly capture the data points of the field and produces a less accurate ML model. A threshold of eight data points has been applied to cluster 520 and cluster 525. Any additional data points selected from cluster 520 and cluster 525 may be discarded such that data points from outside the clusters or from clusters that have not reached the threshold limit may be selected.

An example process using the strategies may be a biased sampling strategy for selecting a subset of data points from all possible data points in the pool of data points. The overall pool of data points may be clustered. Each cluster has an upper limit on how many data points may be selected from that cluster. At the beginning of sampling, the set of all possible data points for sampling is calculated. All possible data points include any data point in the pool which has not been selected before, is under the total budget, has an ROI within the predetermined range of ROI that indicates the informativeness is worth the estimated cost, and the number of data points selected from the cluster that it belongs to has not reached the upper limit. Each data point in the set is assigned a weight, combining the ROI, the cost of assigning the label, and the uncertainty. The biased sampling strategy randomly samples data points from the set based on their weights. If a data point is selected by the biased sampling strategy, it is removed from the set of possible data points to select and the remaining budget is updated. The set of all possible data points is updated based on the selected data point and the new budget. The sampling repeats until there are no possible data points to sample.

Figure 6:
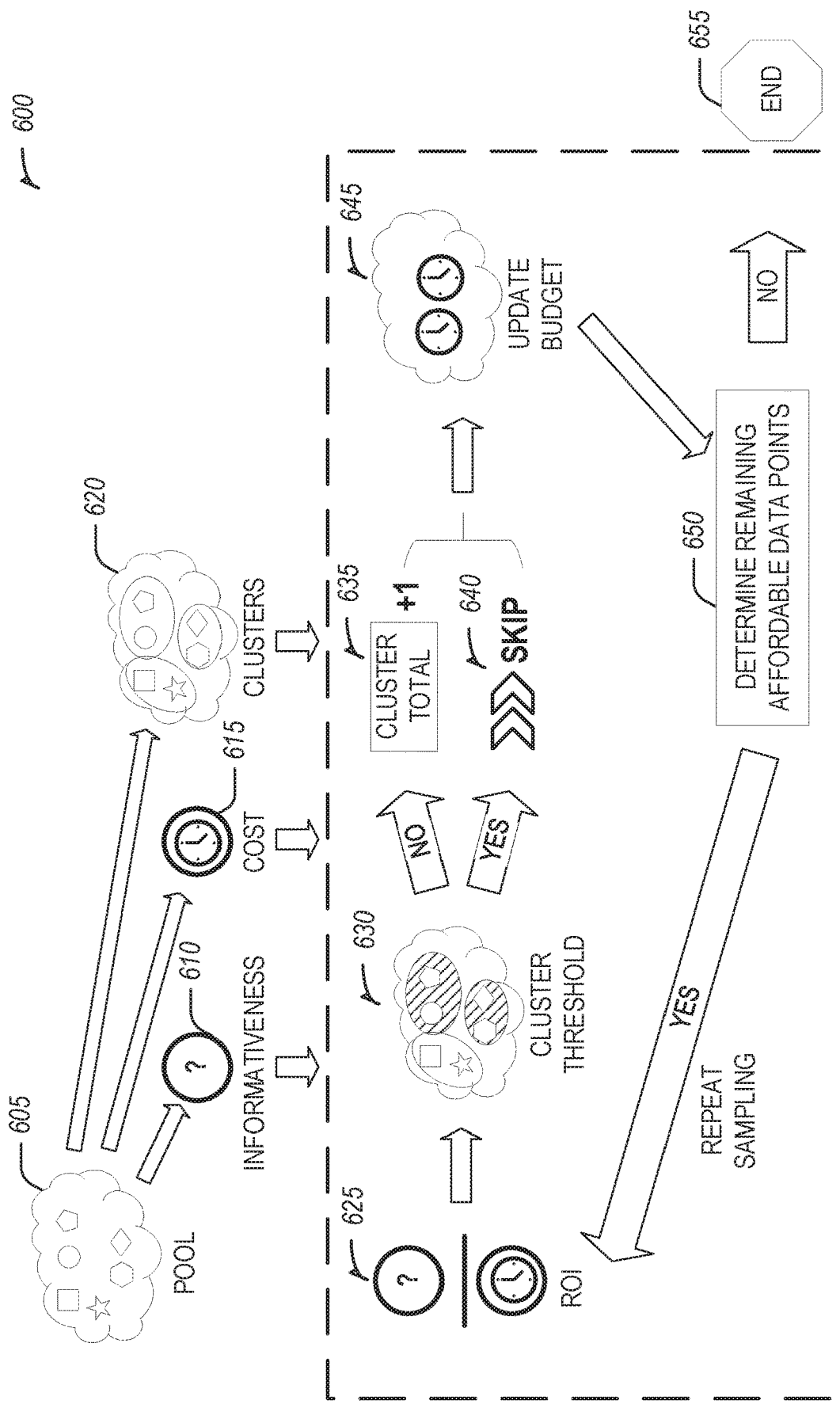
FIG. 6 illustrates the process for an active learning (AL) selection of data points, in accordance with some embodiments.

FIG. 6 illustrates the process 600 for an AL selection of data points, in accordance with some embodiments. The process 600 begins with a pool 605 of data points. The data points in the pool 605 may be evaluated or estimated to determine the informativeness 610 of each data point and the cost 615 of each data point. The clusters 620 for the pool 605 of data points may be determined. The informativeness 610, cost 615, and clusters 620 may be used to determine a selection of data points from the pool 605 which may provide the most information for a given budget.

For a provided data point, the ROI 625 is determined for a data point. If the data point meets a predetermined ROI value, then the data point is selected. The data point is then evaluated based on the clusters 620. If the cluster threshold 630 has been reached for the cluster the data point is a member of, then the data point is skipped 640 and not included in the selection of data points. If the cluster threshold 630 has not been reached for the cluster the data point is a member of, then the data point remains selected and the cluster total 635 is incremented. Based on the cost 615 for the selected data point, the budget is updated 645.

After the budget is updated 645, an evaluation 650 is made to determine if there are any remaining data points in the pool 605 within the remaining budget. If there are, then the sampling is repeated and process begins again with an evaluation of the ROI 625 for each data point. If there are not any remaining data points in the pool 605 within the remaining budget, then the AL data point selection process ends 655.

Figure 7:
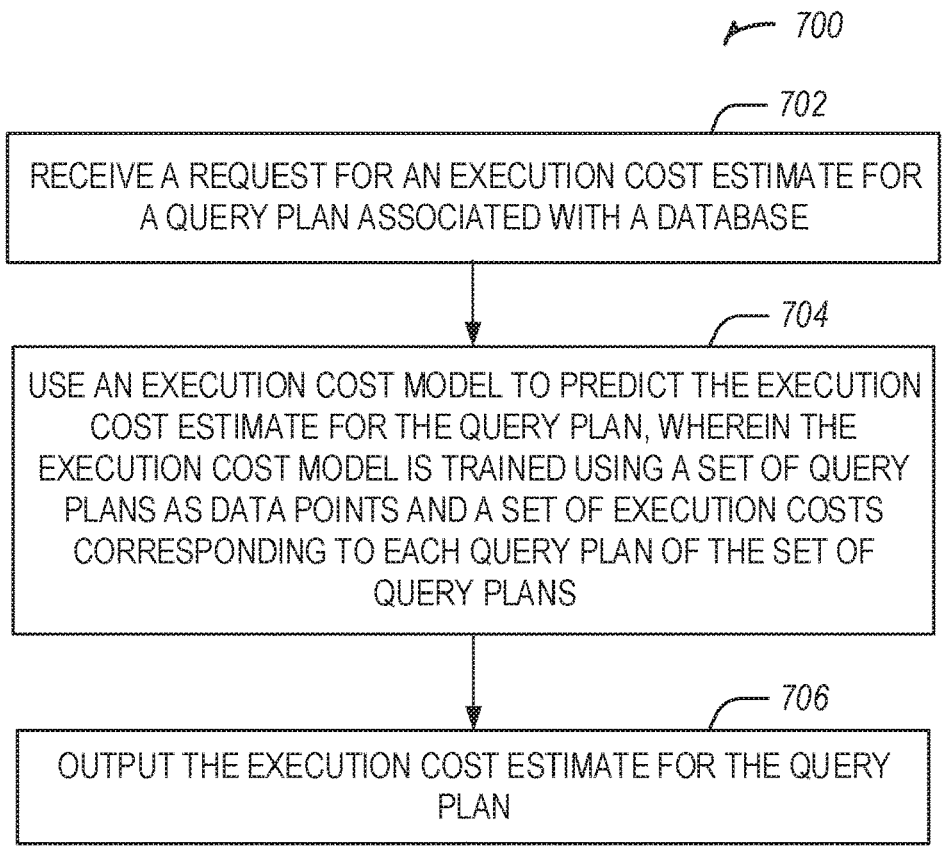
FIG. 7 illustrates a flowchart showing a technique for identifying an execution cost of a query plan, according to some embodiments.

FIG. 7 illustrates a flowchart showing a technique 700 for identifying an execution cost of a query plan, according to some embodiments. An execution cost may be defined differently depending on restrictions present for executing a query with the query plan. For example, the cost may include, but not limited to, the central processing unit (CPU) execution cost or number of cycles, the amount of time required to execute a query with the query plan, or the amount of physical or logical input/output to the database. The technique 700 includes an operation 702 to receive a request for an execution cost estimate for a query plan associated with a database.

The technique 700 includes an operation 704 to use a computing resource utilization model to predict the execution cost estimate for the query plan. The computing resource utilization model may be trained using a set of query plans as data points and a set of execution costs, as the labels, corresponding to each query plan of the set of query plans. The set of query plans may be selected from a pool of query plans with unknown execution costs, or unlabeled data points. The pool of query plans may each be converted into a feature vector to form a set of data points for use with the computing resource utilization model, or ML model.

The set of query plans selected from the pool of query plans to train the ML model may be based on at least one of informativeness, return on investment, or cluster pruning. A selection based on informativeness may determine if the data provided by an execution of a query plan provides data that is beneficial to the computing resource utilization model. Informativeness determines if acquiring the label associated with a data point will improve the ML model. For example, if the ML model already includes five data points which are very similar to the data point in question, then the informativeness of the data point in question may be low, as the ML model already is trained for data points similar to the data point in question.

A selection based on return on investment may determine if the data provided by an execution of a query plan is balanced by a cost associated with the execution. Similar to informativeness, a data point may be evaluated to determine if attaining a label for the data point is beneficial or may improve the model. With ROI, this determination is additionally balanced using the cost to attain the label. For example, the model may have labels for several data points relatively near the data point in question. Using an estimation tool, such as a query optimizer, it may be determined that attaining the label for the data point in question is very costly. Thus, the model may benefit more by attaining a label for a less costly data point that is not near labeled data points.

A selection based on cluster pruning may further include operations to divide the set of data points into a plurality of subsets as a set of clusters. The number of data points needed to form a cluster and the data points relative distance to each other may be determined relative to the total number of data points in the pool and the concentration of data points in the field. A threshold may be used to identify a cluster of data points. For example, a cluster may be formed with a set of ten data points in a pool of one hundred data points, however a group of data point may be considered a cluster with no less than fifty data points for a pool of one thousand data points. A threshold may be used to identify a cluster of data points. The selection based on cluster pruning may further include operations to select data points from the set of data points. A count for each cluster of the set of clusters is incremented for each data point selected from a respective cluster. The selection based on cluster pruning may further include operations to determine, upon the count for a respective cluster reaching a predetermined threshold, to refrain from selecting data points from the respective cluster, such as by discarding a selected data point if it is determined to be from a cluster which has reached the predetermined threshold limit.

The technique 700 includes an operation 704 to output the execution cost estimate for the query plan. The technique 700 may further include operations to select the query plan for use with the database. The technique 700 may further include operations to configure the database based on the query plan and execute a query of the database based on the query plan.

Figure 8:
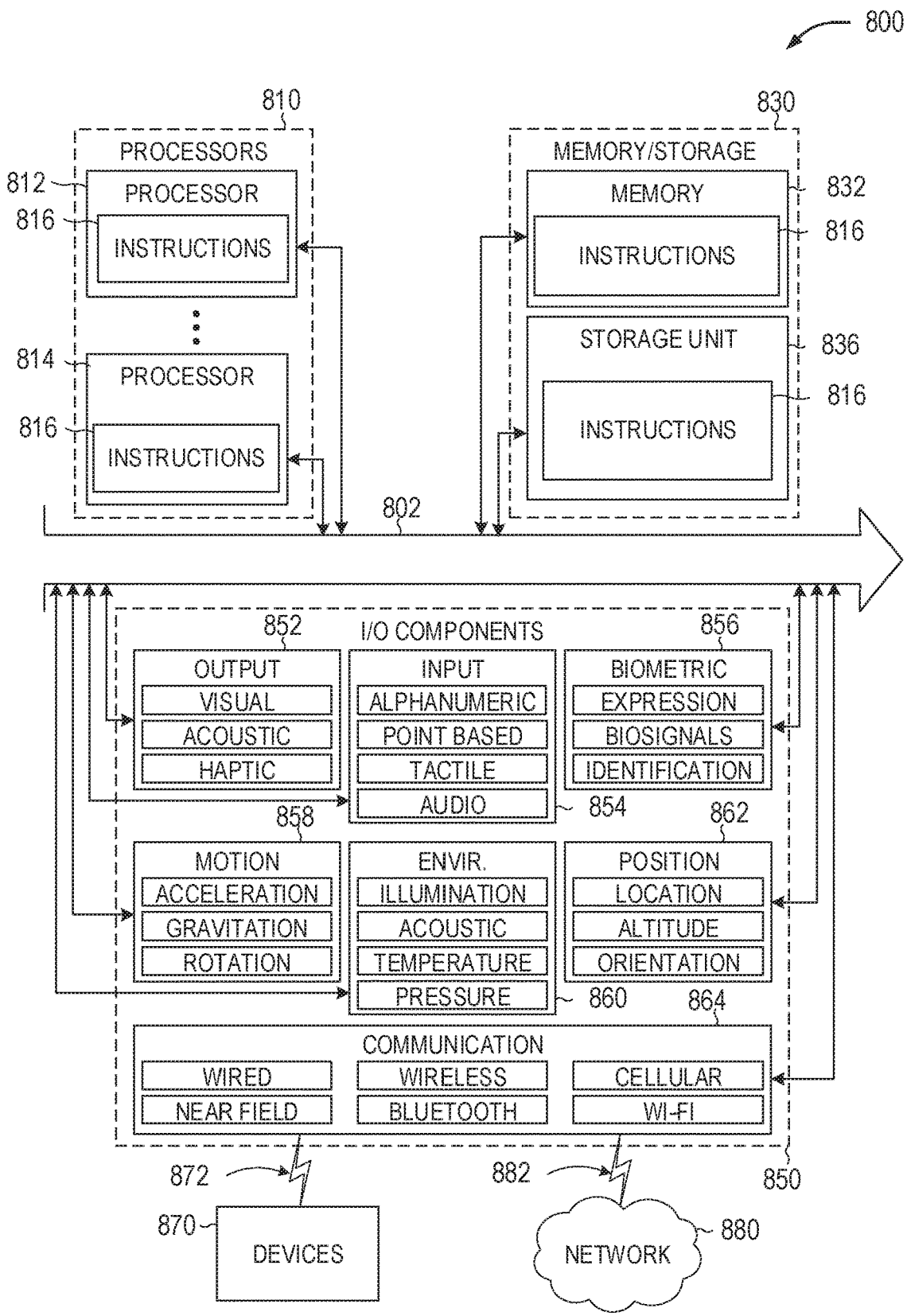
FIG. 8 is a block diagram illustrating an example of a machine upon which one or more embodiments may be implemented.

FIG. 8 is a block diagram illustrating components of a machine 800 which according to some example embodiments is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions (e.g., instructions 816) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The terms machine-readable medium and storage device do not include carrier waves to the extent carrier waves are deemed too transitory.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 852 may include a visual output device adapted to provide augmented visual colors, animations, and presentation of information that is determined to best communicate and improve the user's mood to an optimal state as described herein. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components, or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Example 1 is a system for selecting an execution cost efficient query plan, comprising: at least one processor; and memory including instructions that, when executed by the at least one processor, cause the at least one processor to: receive a first query plan and a second query plan for performing a query with a database, wherein the first query plan is different from the second query plan; use a classifier model to determine execution cost efficiency between the first query plan and the second query plan, wherein the classifier model is trained using relative execution cost comparisons between a set of pairs of query plans for the database; and output a ranking of the first query plan and second query plan, wherein the first query plan and second query plan are ranked based on execution cost efficiency.

In Example 2, the subject matter of Example 1 includes, wherein the first query plan is based on a first index configuration for the database and the second query plan is based on a second index configuration for the database.

In Example 3, the subject matter of Examples 1-2 includes, wherein a set of features are identified for the set of pairs of query plans.

In Example 4, the subject matter of Example 3 includes, wherein a weight is applied to each of the respective features of the set of features.

In Example 5, the subject matter of Example 4 includes, wherein the set of pairs of query plans are converted into feature vectors using the respective set of features of each pair of query plans.

In Example 6, the subject matter of Examples 1-5 includes, wherein the output includes a certainty value indicating a confidence level for the ranking.

In Example 7, the subject matter of Examples 1-6 includes, wherein the classifier model is trained using relative execution cost comparisons between a set of pairs of query plans of a second database.

In Example 8, the subject matter of Example 7 includes, wherein the set of pairs of query plans of the database is less than the set of pairs of query plans of the second database.

In Example 9, the subject matter of Example 8 includes, wherein training the classifier model is based on the set of pairs of query plans of the database and the set of pairs of query plans of the second database.

In Example 10, the subject matter of Examples 1-9 includes, instructions to: determine the first query plan is ranked as more cost efficient than the second query plan; select the first query plan; configure the database based on the first query plan; and execute a query based on the first query plan.

Example 11 is a method for selecting an execution cost efficient query plan, comprising: receiving a first query plan and a second query plan for performing a query with a database, wherein the first query plan is different from the second query plan; using a classifier model to determine execution cost efficiency between the first query plan and the second query plan, wherein the classifier model is trained using relative execution cost comparisons between a set of pairs of query plans for the database, and outputting a ranking of the first query plan and second query plan, wherein the first query plan and second query plan are ranked based on execution cost efficiency.

In Example 12, the subject matter of Example 11 includes, wherein the first query plan is based on a first index configuration for the database and the second query plan is based on a second index configuration for the database.

In Example 13, the subject matter of Examples 11-12 includes, wherein a set of features are identified for the set of pairs of query plans.

In Example 14, the subject matter of Example 13 includes, wherein a weight is applied to each of the respective features of the set of features.

In Example 15, the subject matter of Example 14 includes, wherein the set of pairs of query plans are converted into feature vectors using the respective set of features of each pair of query plans.

In Example 16, the subject matter of Examples 11-15 includes, wherein the output includes a certainty value indicating a confidence level for the ranking.

In Example 17, the subject matter of Examples 11-16 includes, wherein the classifier model is trained using relative execution cost comparisons between a set of pairs of query plans of a second database.

In Example 18, the subject matter of Example 17 includes, wherein the set of pairs of query plans of the database is less than the set of pairs of query plans of the second database.

In Example 19, the subject matter of Example 18 includes, wherein training the classifier model is based on the set of pairs of query plans of the database and the set of pairs of query plans of the second database.

In Example 20, the subject matter of Examples 11-19 includes, determining the first query plan is ranked as more cost efficient than the second query plan; selecting the first query plan; configuring the database based on the first query plan; and executing a query based on the first query plan.

Example 21 is at least one non-transitory computer readable medium including instructions for selecting an execution cost efficient query plan that when executed by at least one processor, cause the at least one processor to: receive a first query plan and a second query plan for performing a query with a database, wherein the first query plan is different from the second query plan; use a classifier model to determine execution cost efficiency between the first query plan and the second query plan, wherein the classifier model is trained using relative execution cost comparisons between a set of pairs of query plans for the database; and output a ranking of the first query plan and second query plan, wherein the first query plan and second query plan are ranked based on execution cost efficiency.

In Example 22, the subject matter of Example 21 includes, wherein the first query plan is based on a first index configuration for the database and the second query plan is based on a second index configuration for the database.

In Example 23, the subject matter of Examples 21-22 includes, wherein a set of features are identified for the set of pairs of query plans.

In Example 24, the subject matter of Example 23 includes, wherein a weight is applied to each of the respective features of the set of features.

In Example 25, the subject matter of Example 24 includes, wherein the set of pairs of query plans are converted into feature vectors using the respective set of features of each pair of query plans.

In Example 26, the subject matter of Examples 21-25 includes, wherein the output includes a certainty value indicating a confidence level for the ranking.

In Example 27, the subject matter of Examples 21-26 includes, wherein the classifier model is trained using relative execution cost comparisons between a set of pairs of query plans of a second database.

In Example 28, the subject matter of Example 27 includes, wherein the set of pairs of query plans of the database is less than the set of pairs of query plans of the second database.

In Example 29, the subject matter of Example 28 includes, wherein training the classifier model is based on the set of pairs of query plans of the database and the set of pairs of query plans of the second database.

In Example 30, the subject matter of Examples 21-29 includes, instructions to: determine the first query plan is ranked as more cost efficient than the second query plan; select the first query plan; configure the database based on the first query plan; and execute a query based on the first query plan.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Example 35 is a system for identifying an execution cost of a query plan, comprising: at least one processor; and memory including instructions that, when executed by the at least one processor, cause the at least one processor to: receive a request for an execution cost estimate for a query plan associated with a database; use an execution cost model to predict the execution cost estimate for the query plan, wherein the execution cost model is trained using a set of query plans as data points and a set of execution costs corresponding to each query plan of the set of query plans; output the execution cost estimate for the query plan.

In Example 36, the subject matter of Example 35 includes, wherein the set of query plans is selected from a pool of query plans with unknown execution costs.

In Example 37, the subject matter of Example 36 includes, wherein the pool of query plans are each converted into a feature vector to form a set of data points.

In Example 38, the subject matter of Example 37 includes, wherein the set of query plans is selected based on at least one of informativeness, return on investment, or cluster pruning.

In Example 39, the subject matter of Example 38 includes, wherein a selection based on informativeness determines if data provided by an execution of a query plan provides data that is beneficial to the execution cost model.

In Example 40, the subject matter of Examples 38-39 includes, wherein a selection based on return on investment determines if data provided by an execution of a query plan is balanced by a cost associated with the execution.

In Example 41, the subject matter of Examples 38-40 includes, wherein a selection based on cluster pruning further comprising instruction to: divide the set of data points into a plurality of subsets as a set of clusters; select data points from the set of data points, wherein a count for each cluster of the set of clusters is incremented for each data point selected from a respective cluster; upon the count for a respective cluster reaching a predetermined threshold, refrain from selecting data points from the respective cluster.

In Example 42, the subject matter of Examples 35-41 includes, instructions to: select the query plan; configure the database based on the query plan; and execute a query based on the query plan.

Example 43 is a method for identifying an execution cost of a query plan, further comprising: receiving a request for an execution cost estimate for a query plan associated with a database; using an execution cost model to predict the execution cost estimate for the query plan, wherein the execution cost model is trained using a set of query plans as data points and a set of execution costs corresponding to each query plan of the set of query plans; outputting the execution cost estimate for the query plan.

In Example 44, the subject matter of Example 43 includes, wherein the set of query plans is selected from a pool of query plans with unknown execution costs.

In Example 45, the subject matter of Example 44 includes, wherein the pool of query plans are each converted into a feature vector to form a set of data points.

In Example 46, the subject matter of Example 45 includes, wherein the set of query plans is selected based on at least one of informativeness, return on investment, or cluster pruning.

In Example 47, the subject matter of Example 46 includes, wherein a selection based on informativeness determines if data provided by an execution of a query plan provides data that is beneficial to the execution cost model.

In Example 48, the subject matter of Examples 46-47 includes, wherein a selection based on return on investment determines if data provided by an execution of a query plan is balanced by a cost associated with the execution.

In Example 49, the subject matter of Examples 46-48 includes, wherein a selection based on cluster pruning further comprising: dividing the set of data points into a plurality of subsets as a set of clusters; selecting data points from the set of data points, wherein a count for each cluster of the set of clusters is incremented for each data point selected from a respective cluster; upon the count for a respective cluster reaching a predetermined threshold, refraining from selecting data points from the respective cluster.

In Example 50, the subject matter of Examples 43-49 includes, selecting the query plan; configuring the database based on the query plan; and executing a query based on the query plan.

Example 51 is at least one non-transitory computer readable medium including instructions for identifying an execution cost of a query plan that when executed by at least one processor, cause the at least one processor to: receive a request for an execution cost estimate for a query plan associated with a database; use an execution cost model to predict the execution cost estimate for the query plan, wherein the execution cost model is trained using a set of query plans as data points and a set of execution costs corresponding to each query plan of the set of query plans; output the execution cost estimate for the query plan.

In Example 52, the subject matter of Example 51 includes, wherein the set of query plans is selected from a pool of query plans with unknown execution costs.

In Example 53, the subject matter of Example 52 includes, wherein the pool of query plans are each converted into a feature vector to form a set of data points.

In Example 54, the subject matter of Example 53 includes, wherein the set of query plans is selected based on at least one of informativeness, return on investment, or cluster pruning.

In Example 55, the subject matter of Example 54 includes, wherein a selection based on informativeness determines if data provided by an execution of a query plan provides data that is beneficial to the execution cost model.

In Example 56, the subject matter of Examples 54-55 includes, wherein a selection based on return on investment determines if data provided by an execution of a query plan is balanced by a cost associated with the execution.

In Example 57, the subject matter of Examples 54-56 includes, wherein a selection based on cluster pruning further comprising instructions to: divide the set of data points into a plurality of subsets as a set of clusters; select data points from the set of data points, wherein a count for each cluster of the set of clusters is incremented for each data point selected from a respective cluster; upon the count for a respective cluster reaching a predetermined threshold, refrain from selecting data points from the respective cluster.

In Example 58, the subject matter of Examples 51-57 includes, instructions to: select the query plan; configure the database based on the query plan; and execute a query based on the query plan.

Example 59 is at least one machine-readable medium including instructions that, when executed by processing circuitry, cause the processing circuitry to perform operations to implement of any of Examples 35-58.

Example 60 is an apparatus comprising means to implement of any of Examples 35-58.

Example 61 is a system to implement of any of Examples 35-58.

Example 62 is a method to implement of any of Examples 35-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for selecting an execution cost efficient query plan, comprising:
   at least one processor; and
   memory including instructions that, when executed by the at least one processor, cause the at least one processor to:
   receive a first query plan and a second query plan for performing a query with a database, wherein the first query plan is different from the second query plan;
   use a classifier model to determine relative execution cost efficiency between the first query plan and the second query plan, wherein the classifier model is trained using pairs of query plans and an indicator of which query plan of each pair of query plans has a more efficient relative execution cost for the database; and
   output a ranking of the first query plan and second query plan, wherein the first query plan and second query plan are ranked based on execution cost efficiency.

2. The system of claim 1, wherein the first query plan is based on a first index configuration for the database and the second query plan is based on a second index configuration for the database.

3. The system of claim 1, wherein a set of features are identified for each pair of query plans.

4. The system of claim 3, wherein a weight is applied to each feature of the set of features.

5. The system of claim 4, wherein the set of pairs of query plans are converted into feature vectors using the respective set of features of each pair of query plans.

6. The system of claim 1, wherein the output includes a certainty value indicating a confidence level for the ranking.

7. The system of claim 1, wherein the classifier model is trained using relative execution cost comparisons between a set of pairs of query plans of a second database.

8. The system of claim 7, wherein the set of pairs of query plans of the database is less than the set of pairs of query plans of the second database.

9. The system of claim 8, wherein training the classifier model is based on the set of pairs of query plans of the database and the set of pairs of query plans of the second database.

10. The system of claim 1, further comprising instructions to:
    determine the first query plan is ranked as more cost efficient than the second query plan;
    select the first query plan;
    configure the database based on the first query plan; and
    execute a query based on the first query plan.

11. A method for selecting an execution cost efficient query plan, comprising:
    receiving a first query plan and a second query plan for performing a query with a database, wherein the first query plan is different from the second query plan;
    using a classifier model to determine relative execution cost efficiency between the first query plan and the second query plan, wherein the classifier model is trained using pairs of query plans and an indicator of which query plan of each pair of query plans has a more efficient relative execution cost for the database; and
    outputting a ranking of the first query plan and second query plan, wherein the first query plan and second query plan are ranked based on execution cost efficiency.

12. The method of claim 11, wherein the first query plan is based on a first index configuration for the database and the second query plan is based on a second index configuration for the database.

13. The method of claim 11, wherein the classifier model is trained using relative execution cost comparisons between a set of pairs of query plans of a second database.

14. The method of claim 13, wherein the set of pairs of query plans of the database is less than the set of pairs of query plans of the second database.

15. The method of claim 14, wherein training the classifier model is based on the set of pairs of query plans of the database and the set of pairs of query plans of the second database.

16. At least one non-transitory computer readable medium including instructions for selecting an execution cost efficient query plan that when executed by at least one processor, cause the at least one processor to:
    receive a first query plan and a second query plan for performing a query with a database, wherein the first query plan is different from the second query plan;

use a classifier model to determine relative execution cost efficiency between the first query plan and the second query plan, wherein the classifier model is trained using pairs of query plans and an indicator of which query plan of each pair of query plans has a more efficient relative execution cost for the database; and output a ranking of the first query plan and second query plan, wherein the first query plan and second query plan are ranked based on execution cost efficiency.

17. The at least one computer readable medium of claim 16, wherein the first query plan is based on a first index configuration for the database and the second query plan is based on a second index configuration for the database.

18. The at least one computer readable medium of claim 16, wherein the classifier model is trained using relative execution cost comparisons between a set of pairs of query plans of a second database.

19. The at least one computer readable medium of claim 18, wherein the set of pairs of query plans of the database is less than the set of pairs of query plans of the second database.

20. The at least one computer readable medium of claim 19, wherein training the classifier model is based on the set of pairs of query plans of the database and the set of pairs of query plans of the second database.

* * * * *